US007792632B2

(12) United States Patent
Ishizuka et al.

(10) Patent No.: US 7,792,632 B2
(45) Date of Patent: Sep. 7, 2010

(54) INTAKE AIR QUANTITY CORRECTING DEVICE

(75) Inventors: Koji Ishizuka, Chita-gun (JP); Kenichiro Nakata, Anjo (JP)

(73) Assignee: Denso Corporation, Kariya (JP)

( * ) Notice: Subject to any disclaimer, the term of this patent is extended or adjusted under 35 U.S.C. 154(b) by 156 days.

(21) Appl. No.: 12/256,100

(22) Filed: Oct. 22, 2008

(65) Prior Publication Data

US 2009/0112447 A1 Apr. 30, 2009

(30) Foreign Application Priority Data

Oct. 24, 2007 (JP) ............................ 2007-276025

(51) Int. Cl.
*F02D 41/14* (2006.01)
*F02D 41/40* (2006.01)
*G06F 19/00* (2006.01)

(52) U.S. Cl. ................................ 701/109; 123/568.15

(58) Field of Classification Search ................ 701/108, 701/109; 123/568.11, 568.14, 568.15, 674, 123/681, 698

See application file for complete search history.

(56) References Cited

U.S. PATENT DOCUMENTS

| | | | | |
|---|---|---|---|---|
| 4,294,212 | A * | 10/1981 | Aoki | 123/681 |
| 5,024,199 | A * | 6/1991 | Abe | 701/106 |
| 5,755,198 | A | 5/1998 | Grob et al. | |
| 5,839,421 | A * | 11/1998 | Suzuki | 123/698 |
| 6,035,839 | A * | 3/2000 | Ohtani et al. | 123/685 |
| 6,122,589 | A | 9/2000 | Yamaguchi et al. | |
| 6,186,116 | B1 | 2/2001 | Armstrong et al. | |
| 6,349,702 | B1 | 2/2002 | Nishiyama | |
| 6,415,779 | B1 * | 7/2002 | Colomby | 701/109 |
| 7,516,734 | B2 | 4/2009 | Tominaga et al. | |
| 2006/0096574 | A1 | 5/2006 | Hirayama et al. | |

FOREIGN PATENT DOCUMENTS

| | | |
|---|---|---|
| EP | 0 962 638 | 12/1999 |
| EP | 1 398 486 | 3/2004 |
| EP | WO 2006/092223 | 9/2006 |
| JP | 01-177437 | 7/1989 |

(Continued)

OTHER PUBLICATIONS

Japanese Office Action dated Feb. 9, 2010, issued in corresponding Japanese Application No. 2007-276025, with English translation.

(Continued)

*Primary Examiner*—Hieu T Vo
(74) *Attorney, Agent, or Firm*—Nixon & Vanderhye PC

(57) ABSTRACT

An intake air quantity correcting device calculates an intake air quantity as a sensing target of an airflow meter (an intake air quantity sensor) based on an injection quantity sensing value sensed with a fuel pressure sensor (an injection quantity sensor) and an oxygen concentration sensing value sensed with an A/F sensor (an oxygen concentration sensor). The intake air quantity correcting device regards a difference between the intake air quantity calculation value calculated in this way and an intake air quantity sensing value sensed with the airflow meter as a sensing error of the airflow meter and corrects the intake air quantity sensing value of the airflow meter based on the sensing error.

18 Claims, 6 Drawing Sheets

FOREIGN PATENT DOCUMENTS

| | | |
|---|---|---|
| JP | 3-104174 | 10/1991 |
| JP | 2001-107797 | 4/2001 |
| JP | 2004-100472 | 4/2004 |
| JP | 2005-076618 | 3/2005 |
| JP | 2007-231829 | 9/2007 |

OTHER PUBLICATIONS

European Search Report dated Feb. 18, 2009, issued in corresponding European Application No. 08166104.3-2311.
Extended European Search Report dated Apr. 22, 2009, issued in corresponding European Application No. 08166104.3-2311.
U.S. Appl. No. 11/930,668 of Ishizuka, filed Oct. 31, 2007.
U.S. Appl. No. 12/179,235 of Ishizuka, filed Jul. 24, 2008.
U.S. Appl. No. 12/186,038 of Nakata, filed Aug. 5, 2008.
U.S. Appl. No. 12/187,638 of Nakata, filed Aug. 7, 2008.
U.S. Appl. No. 12/189,376 of Nakata, filed Aug. 11, 2008.
U.S. Appl. No. 12/194,917 of Nakata filed Aug. 20, 2008.
U.S. Appl. No. 12/195,609 of Nakata filed Aug. 21, 2008.
U.S. Appl. No. 12/194,130 of Nakata filed Aug. 19, 2008.
U.S. Appl. No. 12/197,447 of Nakata filed Aug. 25, 2008.
U.S. Appl. No. 12/201,426 of Nakata filed Aug. 29, 2008.
U.S. Appl. No. 12/210,409 of Nakata filed Sep. 15, 2008.
U.S. Appl. No. 12/210,440 of Nakata filed Sep. 15, 2008.
U.S. Appl. No. 12/233,800 of Nakata filed Sep. 19, 2008.
U.S. Appl. No. 12/235,917 of Nakata filed Sep. 23, 2008.
U.S. Appl. No. 12/236,882 of Ishizuka filed Sep. 24, 2008.
Japanese Office Action dated Sep. 15, 2009, issued in corresponding Japanese Application No. 2007-276025, with English translation.
U.S. Appl. No. 12/255,936, Koji Ishizuka et al., filed Oct. 22, 2008.
U.S. Appl. No. 12/258,726, Koji Ishizuka et al., filed Oct. 27, 2008.
U.S. Appl. No. 12/258,750, Koji Ishizuka et al., filed Oct. 27, 2008.

* cited by examiner

INTAKE AIR QUANTITY CORRECTING DEVICE

CROSS REFERENCE TO RELATED APPLICATION

This application is based on and incorporates herein by reference Japanese Patent Application No. 2007-276025 filed on Oct. 24, 2007.

BACKGROUND OF THE INVENTION

1. Field of the Invention

The present invention relates to an intake air quantity correcting device that corrects an intake air quantity sensing value sensed with an intake air quantity sensor.

2. Description of Related Art

Conventionally, various sensors are fixed to an intake-exhaust system of an internal combustion engine. The various sensors include an intake air quantity sensor for sensing an intake air quantity flowing into a combustion chamber, an oxygen concentration sensor for sensing an oxygen concentration in exhaust gas, and the like. An operation state of the internal combustion engine is controlled based on sensing values of the sensors (for example, refer to Patent document 1: JP-A-2007-231829).

Among the sensors, the intake air quantity sensor causes a relatively large aging change and can cause a variation in an individual difference. Therefore, conventionally, correction of the sensing value of the sensor after factory shipment of the sensor has been desired.

SUMMARY OF THE INVENTION

It is an object of the present invention to provide an intake air quantity correcting device that corrects a sensing value of an intake air quantity sensor used for an internal combustion engine.

According to an aspect of the present invention, an intake air quantity correcting device has an intake air quantity obtaining section, an injection quantity obtaining section, an oxygen concentration obtaining section, a calculating section and an intake air quantity correcting section.

The intake air quantity obtaining section obtains an intake air quantity sensing value from an intake air quantity sensor that senses an intake air quantity flowing from an intake system into a combustion chamber of an internal combustion engine.

The injection quantity obtaining section obtains an injection quantity sensing value from an injection quantity sensor that senses an injection quantity of fuel injected from an injector or a physical quantity relevant to the injection quantity (referred to simply as injection quantity hereinafter).

The oxygen concentration obtaining section obtains an oxygen concentration sensing value from an oxygen concentration sensor that senses an oxygen concentration in exhaust gas discharged from the internal combustion engine.

The calculating section calculates a sensing target of a certain one of the intake air quantity sensor, the injection quantity sensor and the oxygen concentration sensor based on sensing values of the other two sensors.

The intake air quantity correcting section corrects the intake air quantity sensing value based on a difference between the calculation value calculated by the calculating section and the sensing value of the certain one of the sensors.

As mentioned above, the conventional internal combustion engine described in Patent document 1 and the like has the intake air quantity sensor and the oxygen concentration sensor. According to the above-described aspect of the present invention, in addition to these sensors, the injection quantity sensor for sensing the injection quantity of the fuel is provided to the internal combustion engine.

The inventors of the present invention focused attention on that a sensing target of either one of the intake air quantity sensor, the injection quantity sensor and the oxygen concentration sensor can be calculated based on the sensing values of the other two sensors (as explained in more detail later) and invented the above scheme of providing the injection quantity sensor.

According to the above-described aspect of the present invention, the intake air quantity correcting section is provided for correcting the intake air quantity sensing value based on the difference between the sensing value of one of the sensors and the calculation value calculated based on the sensing values of the other two sensors. Therefore, the innovative intake air quantity correcting device that corrects the sensing value of the intake air quantity sensor based on the other sensing values (the injection quantity sensing value and the oxygen concentration sensing value) can be provided.

Next, reasons why the sensing target of one of the intake air quantity sensor, the injection quantity sensor and the oxygen concentration sensor can be calculated based on the sensing values of the other two sensors will be explained with reference to Expressions (1) to (8) and (7') described later about the case of an internal combustion engine shown in FIG. 6. The internal combustion engine shown in FIG. 6 is an example embodiment of the present invention, and the embodiment of the present invention is not limited to the internal combustion engine shown in FIG. 6.

In following Expressions (1) to (8), a variable x indicates a mass flow rate of an air (hereafter referred to simply as an air quantity), and a variable y indicates an oxygen concentration. As shown in FIG. 6, an air quantity x1 and an oxygen concentration y1 of a fresh air passing through an intake pipe 51 can be expressed with Expressions (1) and (5). A value of the variable x1 is a sensing target of an intake air quantity sensor 47, and a value of the variable y1 is the oxygen concentration in the atmosphere and is the already known value.

An air quantity x2 and an oxygen concentration y2 of recirculated exhaust gas passing through an EGR pipe 52 can be expressed with Expressions (2) and (6). An air quantity x3 and an oxygen concentration y3 of an intake air as a mixture of the fresh air and the recirculated exhaust gas can be expressed with Expressions (3) and (7). The value x3 is a theoretical value that can be theoretically calculated based on a volume of a combustion chamber 50*a*, a suction efficiency at the time when a piston 50*b* descends and the like.

An air quantity x4 and an oxygen concentration y4 of exhaust gas passing through a portion of an exhaust pipe 53 upstream of the EGR pipe 52 can be expressed with Expressions (4) and (8). Q in Expression (8) indicates the injection quantity of the fuel injected into the combustion chamber 50*a* and is a sensing target of the injection quantity sensor 20*a*. The value y4 is a sensing target of an oxygen concentration sensor 48.

x1=sensing target of intake air quantity sensor     Expression (1)

$$x2=x3-x1 \quad \text{Expression (2)}$$

x3=theoretical value (calculated based on volume of combustion chamber suction efficiency, and the like)     Expression (3)

$$x4=x3 \quad \text{Expression (4)}$$

y1=theoretical value (oxygen concentration in atmosphere) Expression (5)

y2=y4 Expression (6)

$y3=(x1\cdot y1+x2\cdot y2)/(x1+x2)$ Expression (7)

$y4=f(x3,y3,Q)$ Expression (8)

In Expression (8), the value y4 is the sensing target of the oxygen concentration sensor 48 and is known from the oxygen concentration sensing value. The value x3 is the theoretical value and is known. The value Q is the sensing target of the injection quantity sensor 20*a* and is known from the injection quantity sensing value. Since the values y4, x3, Q in Expression (8) are known, the value of the remaining variable y3 is also known.

Expression (7) can be converted into following Expression (7') by using Expression (2).

$y3=(x1(y1-y2)+x3\cdot y2)/x3$ Expression (7')

In Expression (7'), the value y3 is known as mentioned above. The value y1 is the theoretical value and is known. The value y2 is the same as the value y4 as mentioned above and is known. The value x3 is the theoretical value and is known. Since the values y3, y1, y2, x3 in Expression (7') are known, the value of the remaining variable x1 is also known.

Thus, the values x2, x3, x4, y1, y2, y3 are theoretically known. Therefore, a value of either one of the variable x1 (the intake air quantity sensing value), the variable Q (the injection quantity sensing value) and the variable y4 (the oxygen concentration sensing value) that remain can be calculated based on the values of the other two variables. Therefore, it can be said that the sensing target of either one of the intake air quantity sensor, the injection quantity sensor and the oxygen concentration sensor can be calculated based on the sensing values of the other two sensors. This applies not only to a diesel engine having the EGR valve shown in FIG. 6 but also to other internal combustion engines in similar ways.

According to another aspect of the present invention, the calculating section calculates the intake air quantity based on the injection quantity sensing value and the oxygen concentration sensing value. The intake air quantity correcting section corrects the intake air quantity sensing value based on a difference between the intake air quantity calculation value calculated by the calculating section and the intake air quantity sensing value.

According to another aspect of the present invention, the calculating section calculates the oxygen concentration based on the intake air quantity sensing value and the injection quantity sensing value. The intake air quantity correcting section corrects the intake air quantity sensing value based on a difference between the oxygen concentration calculation value calculated by the calculating section and the oxygen concentration sensing value.

Alternatively, the calculating section may calculate the injection quantity based on the intake air quantity sensing value and the oxygen concentration sensing value, and the intake air quantity correcting section may correct the intake air quantity sensing value based on a difference between the injection quantity calculation value calculated by the calculating section and the injection quantity sensing value.

According to another aspect of the present invention, the intake air quantity correcting device further has a learning section that regards a difference between the intake air quantity calculation value and the intake air quantity sensing value as an error of the intake air quantity sensing value and that stores a value of the error in a map defining a relationship between the error and the intake air quantity. With such the construction, the values of the error in the entire sensing range of the intake air quantity sensor can be stored in the map and learned. Accordingly, the intake air quantity sensing value can be corrected in the entire sensing range.

According to each of following seven aspects of the present invention, the calculating section performs the calculation and the intake air quantity correcting section performs the correction based on the injection quantity sensing value, the oxygen concentration sensing value and the intake air quantity sensing value sensed during a time when an operation state of the internal combustion engine is stable (i.e., during a stable state time). Accordingly, the value calculated as the difference between the intake air quantity calculation value and the intake air quantity sensing value can be inhibited from containing an error caused by other factors (influences) than the error of the intake air quantity sensing value. Therefore, the error of the intake air quantity sensing value can be calculated with high accuracy, and eventually the accuracy of the correction by the intake air quantity correcting section can be improved.

According to another aspect of the present invention, the internal combustion engine has an exhaust gas recirculation valve for regulating an exhaust gas recirculation quantity recirculated from an exhaust system to an intake system. The calculation and the correction are performed by using a time when the exhaust gas recirculation valve is fixed to a fully closed state continuously as the stable state time. With such the construction, the influence of the EGR quantity can be eliminated from the value calculated as the difference between the intake air quantity calculation value and the intake air quantity sensing value. As a result, the accuracy of correction by the intake air quantity correcting section can be improved.

According to another aspect of the present invention, the internal combustion engine has a throttle valve that adjusts the intake air quantity flowing into the combustion chamber. The calculation and the correction are performed by using a time when the throttle valve is fixed to a fully opened state continuously as the stable state time. With such the construction, the influence of the throttle valve opening degree can be eliminated from the value calculated as the difference between the intake air quantity calculation value and the intake air quantity sensing value. As a result, the accuracy of correction by the intake air quantity correcting section can be improved.

According to another aspect of the present invention, the internal combustion engine has a supercharger that supercharges the intake air by using the exhaust gas as a source of a driving force. The supercharger is structured to be able to variably set a conversion rate for converting a fluid energy of the exhaust gas into the driving force. The calculation and the correction are performed by using a time when the conversion rate of the supercharger is set within a predetermined range continuously as the stable state time. With such the construction, the influence of the change in the supercharging state can be eliminated from the value calculated as the difference between the intake air quantity calculation value and the intake air quantity sensing value. As a result, the accuracy of correction by the intake air quantity correcting section can be improved.

A variable capacity turbocharger may be employed as an example of the above-described construction capable of variably setting a rate, at which the fluid energy of the exhaust gas is converted into the driving force. More specifically, a construction of providing a variable vane to a turbine wheel constituting the turbocharger, a construction having a variable flap for adjusting a blow-off quantity in a nozzle blowing off the exhaust gas toward the turbine wheel, or the like may be employed.

According to another aspect of the present invention, the internal combustion engine has a supercharger that supercharges the intake air by using the exhaust gas as a source of a driving force. The calculation and the correction are performed by using a time when supercharging pressure provided by the supercharger remains stable for a specified time or over as the stable state time. With such the construction, the influence of the change in the supercharging pressure can be eliminated from the value calculated as the difference between the intake air quantity calculation value and the intake air quantity sensing value. As a result, the accuracy of correction by the intake air quantity correcting section can be improved.

The sensing response delay of the intake air quantity sensor increases as the length of the intake pipe 51 from the installation position of the intake air quantity sensor to the combustion chamber 50*a* increases. The sensing response delay of the oxygen concentration sensor increases as the length of the exhaust pipe 53 from the installation position of the oxygen concentration sensor to the combustion chamber 50*a* increases.

In this regard, according to another aspect of the present invention, the calculation and the correction are performed by using a time when rotation speed of an output shaft of the internal combustion engine remains stable for a specified time or over as the stable state time. With such the construction, the influence of the response delay can be eliminated from the value calculated as the difference between the intake air quantity calculation value and the intake air quantity sensing value. As a result, the accuracy of correction by the intake air quantity correcting section can be improved.

According to another aspect of the present invention, the calculation and the correction are performed by using a time when the intake air quantity sensed with the intake air quantity obtaining section remains stable for a specified time or over as the stable state time. With such the construction, the influence of the change of the intake air quantity as the sensing target of the intake air quantity sensor can be eliminated from the value calculated as the difference between the intake air quantity calculation value and the intake air quantity sensing value. As a result, the accuracy of correction by the intake air quantity correcting section can be improved.

According to another aspect of the present invention, the calculation and the correction are performed by using a time when the injection quantity or the physical quantity relevant to the injection quantity sensed with the injection quantity obtaining section remains stable for a specified time or over as the stable state time. With such the construction, the influence of the change of the injection quantity as the sensing target of the injection quantity sensor can be eliminated from the value calculated as the difference between the intake air quantity calculation value and the intake air quantity sensing value. As a result, the accuracy of correction by the intake air quantity correcting section can be improved.

According to another aspect of the present invention the intake air quantity correcting device is applied to an internal combustion engine control device including an oxygen concentration calculating section and an exhaust gas recirculation controlling section. The oxygen concentration calculating section calculates an oxygen concentration in the exhaust gas based on the intake air quantity sensing value corrected by the intake air quantity correcting section and the injection quantity sensing value. The exhaust gas recirculation controlling section performs feedback control of an opening degree of an exhaust gas recirculation valve to approximate the oxygen concentration calculation value calculated by the oxygen concentration calculating section to a target value.

With such the construction, the oxygen concentration calculating section calculates the oxygen concentration in the exhaust gas using the intake air quantity sensing value corrected as mentioned above. Therefore, highly accurate oxygen concentration in the exhaust gas can be obtained. Accordingly, the accuracy of the feedback control by the exhaust gas recirculation controlling section using the oxygen concentration can be also improved. As a result, the emission state can be controlled with high accuracy.

According to another aspect of the present invention, the internal combustion engine is structured to distribute and supply the fuel from a pressure accumulator, which accumulates the fuel, to the injector. The injection quantity sensor is a fuel pressure sensor that senses pressure of the fuel supplied to the injector as the physical quantity and is arranged in a fuel passage, which extends from the pressure accumulator to an injection hole of the injector, at a position closer to the injection hole than the pressure accumulator.

The pressure of the fuel supplied to the injector fluctuates in connection with the fuel injection from the injection hole. Therefore, by sensing the fluctuation mode (e.g., a fuel pressure decrease amount, a fuel pressure decrease time, and the like), the actual injection quantity can be calculated. According to the above-described aspect of the present invention, the fuel pressure sensor that senses the pressure of the fuel supplied to the injector as the physical quantity relevant to the injection quantity is employed as the injection quantity sensor. Accordingly, the injection quantity can be calculated as mentioned above.

Moreover, according to the aspect of the present invention, the fuel pressure sensor is arranged in the fuel passage, which extends from the pressure accumulator to the injection hole of the injector, at the position closer to the injection hole than the pressure accumulator. Accordingly, the pressure fluctuation in the injection hole can be sensed before the pressure fluctuation attenuates inside the pressure accumulator. Therefore, the pressure fluctuation caused with the injection can be sensed with high accuracy, so the injection quantity can be calculated with high accuracy.

As other application examples than the example adopting the fuel pressure sensor as the injection quantity sensor, a lift sensor that senses a valve member lift amount of the injector as a physical quantity relevant to the injection quantity, a flow meter arranged in a fuel supply passage extending to the injection hole for sensing a fuel flow rate as the injection quantity or the like may be adopted as the injection quantity sensor.

According to another aspect of the present invention, the fuel pressure sensor is fixed to the injector. Therefore, the fixation position of the fuel pressure sensor is closer to the injection hole of the injector than in the case where the fuel pressure sensor is fixed to a pipe connecting the pressure accumulator and the injector. Accordingly, the pressure fluctuation in the injection hole can be sensed more appropriately than in the case where the pressure fluctuation is sensed after the pressure fluctuation in the injection hole attenuates in the pipe.

According to another aspect of the present invention, the fuel pressure sensor is fixed to a fuel inlet of the injector. According to another aspect of the present invention, the fuel pressure sensor is mounted inside the injector to sense fuel pressure in an internal fuel passage extending from the fuel inlet of the injector to the injection hole of the injector.

The fixing structure of the fuel pressure sensor can be simplified in the case where the fuel pressure sensor is fixed to the fuel inlet as compared with the case where the fuel pressure sensor is mounted inside the injector. When the fuel pressure sensor is mounted inside the injector, the fixing position of the fuel pressure sensor is closer to the injection hole of the injector than in the case where the fuel pressure sensor is fixed to the fuel inlet. Therefore, the pressure fluctuation in the injection hole can be sensed more appropriately.

According to another aspect of the present invention, an orifice is provided in a fuel passage, which extends from the pressure accumulator to a fuel inlet of the injector, for attenuating a pressure pulsation of the fuel in the pressure accumulator. The fuel pressure sensor is arranged downstream of the orifice with respect to a fuel flow direction. If the fuel pressure sensor is arranged upstream of the orifice, the pressure fluctuation after the pressure fluctuation in the injection hole is attenuated by the orifice is sensed. In contrast, the fuel pressure sensor is arranged downstream of the orifice according to the above-described aspect of the present invention. Accordingly, the pressure fluctuation before the pressure fluctuation is attenuated by the orifice can be sensed, so the pressure fluctuation in the injection hole can be sensed more appropriately.

According to yet another aspect of the present invention, an intake air quantity correcting system has at least one of an intake air quantity sensor that senses an intake air quantity, an injection quantity sensor that senses an injection quantity or a physical quantity relevant to the injection quantity, and an oxygen concentration sensor that senses an oxygen concentration in the exhaust gas and the intake air quantity correcting device. The intake air quantity correcting system can exert the above-mentioned various effects similarly.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Hereafter, an intake air quantity correcting device according to an embodiment of the present invention will be described with reference to the drawings. First, an outline of an engine (an internal combustion engine) mounted with the intake air quantity correcting device according to the present embodiment will be explained briefly.

The device according to the present embodiment is used for a diesel engine (an internal combustion engine) for a four-wheeled vehicle. The engine performs injection supply (direct injection supply) of high-pressure fuel (for example, light oil at injection pressure of 1000 atmospheres or higher) directly into a combustion chamber. It is assumed that the engine according to the present embodiment is a four-stroke reciprocating diesel engine (an internal combustion engine) having multiple cylinders (for example, in-line four cylinders). In each of the four cylinders #1 to #4, a combustion cycle consisting of four strokes of an intake stroke, a compression stroke, a combustion stroke, and an exhaustion stroke is sequentially performed in the order of the cylinders #1, #3, #4, and #2 in the cycle of 720° CA, and in more detail, while the combustion cycles are deviated from each other by 180° CA between the cylinders.

Next, a fuel system of the engine will be explained with reference to FIGS. 1 to 5.

Figure 1:
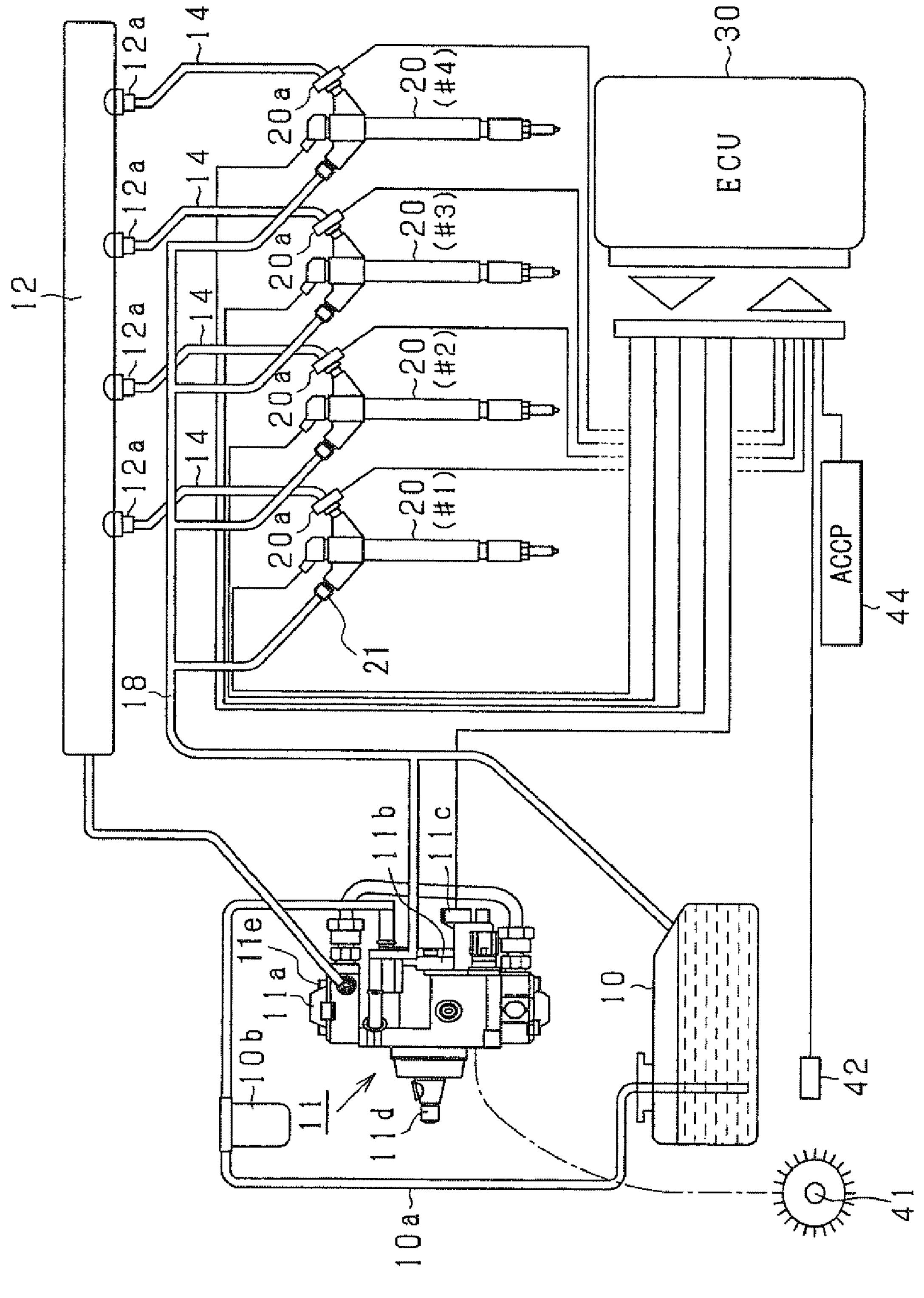
FIG. 1 is a schematic diagram showing a fuel system applied with an intake air quantity correcting device according to an embodiment of the present invention.

FIG. 1 is a configuration diagram showing a common rail fuel injection system according to the present embodiment. An ECU 30 (an electronic control unit) provided in the system adjusts a supply quantity of current supplied to a suction control valve 11*c*, thereby controlling a fuel discharge quantity of a fuel pump 11 to a desired value. Thus, the ECU 30 performs feedback control (for example, PID control) for conforming fuel pressure in a common rail 12 (a pressure accumulator), i.e., current fuel pressure measured with a fuel pressure sensor 20*a*, to a target value (target fuel pressure). The ECU 30 controls a fuel injection quantity for a predetermined cylinder of the target engine and eventually an output of the engine (i.e., rotation speed of an output shaft or torque) to desired magnitudes based on the fuel pressure.

The devices constituting the fuel supply system including the fuel tank 10, the fuel pump 11, the common rail 12, and the injectors 20 (fuel injection valves) are arranged in this order from a fuel flow upstream side. The fuel pump 11 consists of a high-pressure pump 11*a* and a low-pressure pump 11*b* driven by an output of the target engine. The fuel pump 11 is structured such that the fuel drawn by the low-pressure pump 11*b* from the fuel tank 10 is pressurized and discharged by the high-pressure pump 11*a*. A fuel pumping quantity sent to the high-pressure pump 11*a* and an eventual fuel discharge quantity of the fuel pump 11 are metered by the suction control valve 11*c* (SCV) provided on a fuel suction side of the fuel pump 11. The fuel pump 11 can control the fuel discharge quantity from the pump 11 to a desired value by regulating the drive current (and eventually, an opening degree) of the suction control valve 11*c*.

The low-pressure pump 11*b* is constituted, for example, as a trochoid feed pump. The high-pressure pump 11*a* consists of a plunger pump, for example. The high-pressure pump 11*a* is structured to be able to sequentially pump the fuel, which is sent to pressurization chambers, at predetermined timing by reciprocating predetermined plungers (for example, three plungers) in axial directions thereof with an eccentric cam (not illustrated) respectively.

The fuel in the fuel tank 10 is pressure-fed (pumped) to the common rail 12 by the fuel pump 11 and is accumulated in the common rail 12 at a high-pressure state. Then, the fuel is distributed and supplied to the injectors 20 of the cylinders #1 to #4 respectively through high-pressure pipes 14 provided to the respective cylinders. Fuel discharge holes 21 of the injectors 20(#1) to 20(#4) are connected with a pipe 18 for returning excess fuel to the fuel tank 10. An orifice 12a (a fuel pulsation reducing section) is provided between the common rail 12 and the high-pressure pipe 14 for attenuating a pressure pulsation of the fuel flowing from the common rail 12 to the high-pressure pipe 14.

Figure 2:
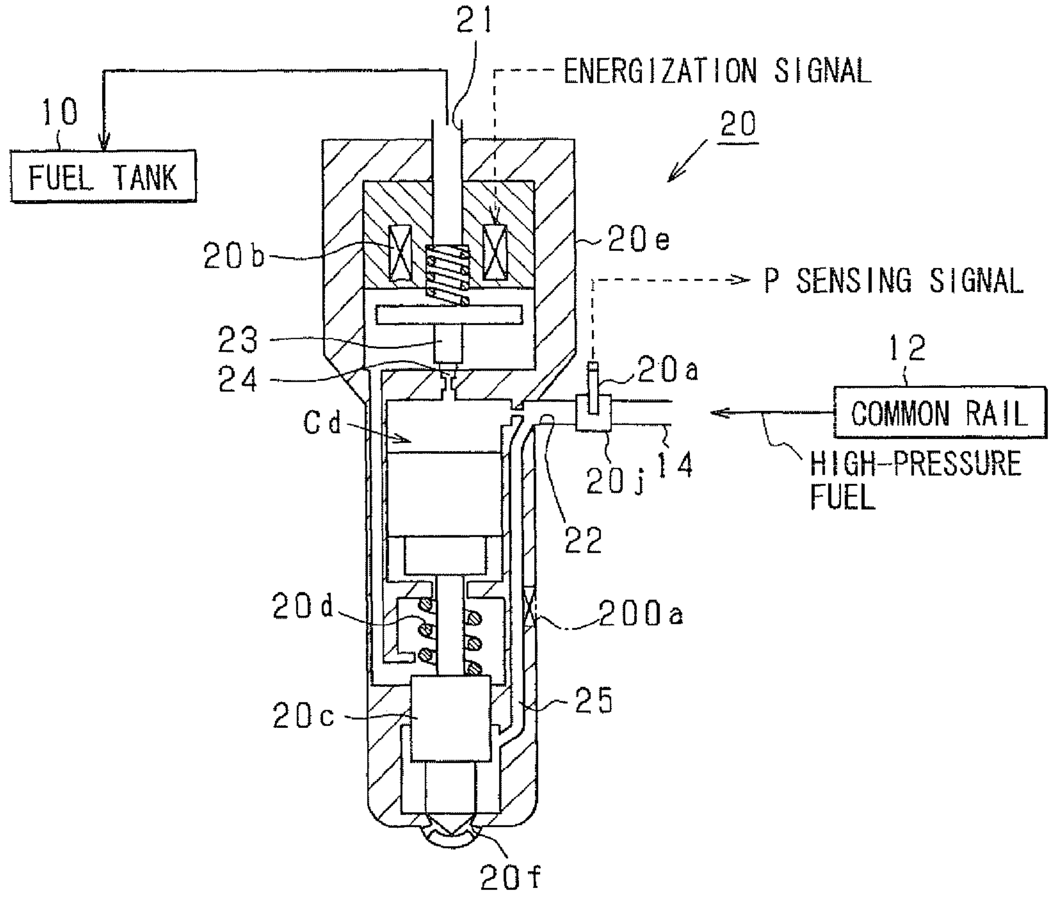
FIG. 2 is an internal side view schematically showing an internal structure of an injector according to the embodiment.

A detailed structure of the injector 20 is shown in FIG. 2. Basically, the four injectors 20(#1) to 20(#4) have the same structure (for example, a structure shown in FIG. 2). Each injector 20 is a hydraulic drive type injector using the engine combustion fuel (i.e., the fuel in the fuel tank 10). In the injector 20, a driving power for the fuel injection is transmitted through an oil pressure chamber Cd (i.e., a control chamber). As shown in FIG. 2, the injector 20 is structured as a fuel injection valve of a normally-closed type that is brought to a valve-closed state when de-energized.

The high-pressure fuel sent from the common rail 12 flows into a fuel inlet 22 formed in a housing 20e of the injector 20. Part of the inflowing high-pressure fuel flows into the oil pressure chamber Cd and the other part of the inflowing high-pressure fuel flows toward injection holes 20f. A leak hole 24 is formed in the oil pressure chamber Cd and is opened and closed by a control valve 23. If the leak hole 24 is opened by the control valve 23, the fuel in the oil pressure chamber Cd is returned to the fuel tank 10 through the fuel discharge hole 21 from the leak hole 24.

When the fuel injection is performed with the injector 20, the control valve 23 is operated in accordance with an energization state (energization/de-energization) of a solenoid 20b constituting a two-way electromagnetic valve. Thus, a sealed degree of the oil pressure chamber Cd and eventually pressure in the oil pressure chamber Cd (equivalent to back pressure of a needle valve 20c) are increased/decreased. Due to the increase/decrease in the pressure, the needle valve 20c reciprocates (moves upward and downward) inside the housing 20e along with or against an extensional force of a spring 20d (a coil spring) (i.e., an elastic force of the spring 20d to extend). Accordingly, a fuel supply passage 25 to the injection holes 20f (a necessary number of which are bored) is opened/closed at a halfway thereof (more specifically, at a tapered seat face, which the needle valve 20c is seated on and which the needle valve 20c is separated from in accordance with the reciprocating movement of the needle valve 20c).

Drive control of the needle valve 20c is performed through on-off control. That is, a pulse signal (an energization signal) directing ON/Off is sent from the ECU 30 to a drive section (the two-way electromagnetic valve) of the needle valve 20c. The needle valve 20c lifts and opens the injection holes 20f when the pulse is ON (or OFF), and the needle valve 20c descends to block the injection holes 20f when the pulse is OFF (or ON).

The pressure increase processing of the oil pressure chamber Cd is performed by the fuel supply from the common rail 12. Pressure reduction processing of the oil pressure chamber Cd is performed by operating the control valve 23 by the energization to the solenoid 20b and thus opening the leak hole 24. Thus, the fuel in the oil pressure chamber Cd is returned to the fuel tank 10 through the pipe 18 (shown in FIG. 1) connecting the injector 20 and the fuel tank 10. That is, the operation of the needle valve 20c that opens and closes the injection holes 20f is controlled by regulating the fuel pressure in the oil pressure chamber Cd through the opening and closing operation of the control valve 23.

Thus, the injector 20 has the needle valve 20c that performs valve opening and valve closing of the injector 20 by opening and closing the fuel supply passage 25 extending to the injection holes 20f through a predetermined reciprocation operation inside the valve body (i.e., the housing 20e). In a non-driven state, the needle valve 20c is displaced in a valve-closing direction by the force (the extensional force of the spring 20d) constantly applied to the needle valve 20c in the valve-closing direction. In a driven state, the needle valve 20c is applied with a driving force, so the needle valve 20c is displaced in a valve-opening direction against the extensional force of the spring 20d. The lift amount of the needle valve 20c changes substantially symmetrically between the non-driven state and the driven state.

A fuel pressure sensor 20a (also refer to FIG. 1) for sensing the fuel pressure is fixed to the injector 20. The fuel inlet 22 formed in the housing 20e and the high-pressure pipe 14 are connected through a jig 20j, and the fuel pressure sensor 20a is fixed to the jig 20j. Thus, by fixing the fuel pressure sensor 20a to the fuel inlet 22 of the injector 20 in this way, fuel pressure P (inlet pressure) at the fuel inlet 22 can be sensed at any time. More specifically, a fluctuation waveform of the fuel pressure accompanying an injection operation of the injector 20, a fuel pressure level (i.e., stable pressure), fuel injection pressure and the like can be sensed (measured) with the output of the fuel pressure sensor 20a.

The fuel pressure sensors 20a are provided to the multiple injectors 20(#1) to 20(#4) respectively. The fluctuation waveform of the fuel pressure accompanying the injection operation of the injector 20 concerning a predetermined injection can be sensed with high accuracy based on the outputs of the fuel pressure sensors 20a (as mentioned in more detail later).

A microcomputer mounted in the ECU 30 consists of a CPU (a basic processing unit) for performing various kinds of computation, a RAM as a main memory for temporarily storing data in the process of the computation, computation results and the like, a ROM as a program memory, an EEPROM as a memory for data storage, a backup RAM (a memory invariably supplied with power from a backup power supply such as an in-vehicle battery even after a main power supply of the ECU 30 is stopped), and the like. Various kinds of programs, control maps and the like concerning the engine control including the program concerning the fuel injection control are beforehand stored in the ROM, and the various kinds of control data including the design data of the target engine are beforehand stored in the memory for data storage (for example, the EEPROM).

The ECU 30 calculates a rotation angle position and rotation speed (engine rotation speed NE) of an output shaft (a crankshaft 41) of the target engine based on a sensing signal inputted from a crank angle sensor 42. The ECU 30 calculates an operation amount ACCP (a pressed amount) of an accelerator by the driver based on a sensing signal inputted from an accelerator sensor 44. The ECU 30 grasps the operation state of the target engine and requests of a user based on the sensing signals of the above-described various sensors 42, 44 and other various sensors mentioned later. The ECU 30 performs various kinds of control relating to the above-described engine in the optimum modes corresponding to the situation of each time by operating the various actuators such as the above-described suction control valve 11c and the injectors 20 in accordance with the operation state of the target engine and the requests of the user.

Next, an outline of control of the fuel system performed by the ECU 30 will be explained.

The microcomputer of the ECU 30 calculates the fuel injection quantity in accordance with the engine operation state (such as the engine rotation speed NE), the operation amount ACCP of the accelerator by the driver and the like at each time and outputs an injection control signal (an injection command signal) for directing the fuel injection with the calculated fuel injection quantity to the injector 20 in synchronization with desired injection timing. When the injector 20 operates with a drive amount (for example, a valve opening period) corresponding to the injection control signal, the output torque of the target engine is controlled to a target value.

Figure 3:
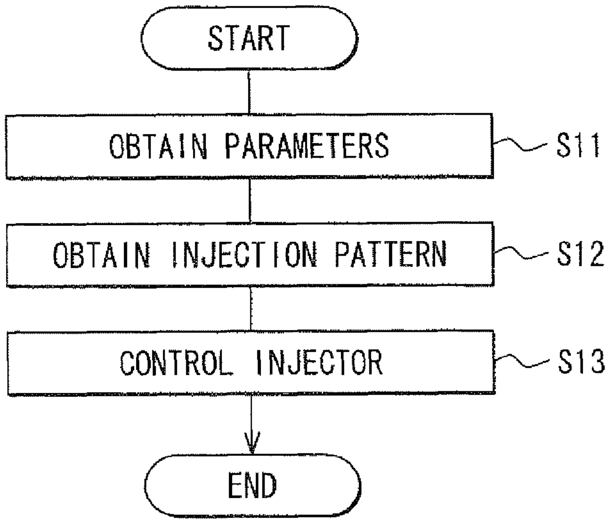
FIG. 3 is a flowchart showing a basic procedure of fuel injection control processing according to the embodiment.

Hereafter, a fundamental processing procedure of the fuel system control according to the present embodiment will be explained with reference to FIG. 3. Values of the various parameters used in the processing shown in FIG. 3 are stored at any time in the storage device mounted in the ECU 30 such as the RAM, the EEPROM or the backup RAM and are updated at any time when necessary. Basically, the ECU 30 executes the program stored in the ROM to perform the a series of processing shown by the flowchart of FIG. 3.

As shown in FIG. 3, first in S11 (S means "Step") in a series of the processing, predetermined parameters such as the current engine rotation speed NE (i.e., an actual measurement value measured by the crank angle sensor 42) and the fuel pressure P (i.e., an actual measurement value measured by the fuel pressure sensor 20*a*) are read and also the accelerator operation amount ACCP (i.e., an actual measurement value measured by the accelerator sensor 44) by the driver at the time and the like are read.

In following S12, an injection pattern is set based on the various parameters read in S11. For example, in the case of a single-stage injection, an injection quantity (an injection period) of the injection is variably set in accordance with the torque that should be generated in the output shaft (the crankshaft 41), i.e., the request torque that is calculated from the accelerator operation amount ACCP and the like and that is equivalent to the engine load at the time. In the case of a multi-stage injection, a total injection quantity (a total injection period) of injections contributing to the torque is variably set in accordance with the torque that should be generated in the crankshaft 41, i.e., the request torque.

The injection pattern is obtained based on a predetermined map (an injection control map or a mathematical expression) and a correction coefficient stored in the ROM, for example. More specifically, the optimum injection pattern (adaptation values) is beforehand obtained by experiment and the like in anticipated ranges of the predetermined parameters (read in S11) and is written in the injection control map, for example.

For example, the injection pattern is defined by parameters such as the number of injection stages (i.e., the time number of injections performed during one combustion cycle), the injection timing of each injection and the injection period (equivalent to the injection quantity) of each injection. Thus, the above-described injection control map indicates the relationship between the parameters and the optimum injection pattern.

The injection pattern obtained based on the injection control map is corrected with the correction coefficient (stored in the EEPROM in the ECU 30, for example) that is separately updated. For example, a set value is calculated by dividing the map value by the correction coefficient. Thus, the injection pattern of the injection that should be performed at the time and eventually the injection command signal for the injector 20 corresponding to the injection pattern are acquired. The correction coefficient (more strictly, a predetermined coefficient out of the multiple types of coefficients) is sequentially updated by separate processing during the operation of the internal combustion engine.

When the injection pattern is set (in S12), maps set individually for the respective elements of the injection pattern (such as the injection stage number) may be used. Alternatively, maps, each of which is made for some collective elements of the injection pattern, or a map for all the elements of the injection pattern may be used.

The thus-set injection pattern or the eventual command value (the injection command signal) corresponding to the injection pattern is used in following S13. That is, in S13 (a command signal outputting section), the drive of the injector 20 is controlled based on the command value (the injection command signal), or more specifically, by outputting the injection command signal to the injector 20. After the drive control of the injector 20, the series of the processing shown in FIG. 3 is ended.

Next, processing for estimating the fuel injection quantity from the injector 20 will be explained with reference to FIG. 4.

Figure 4:
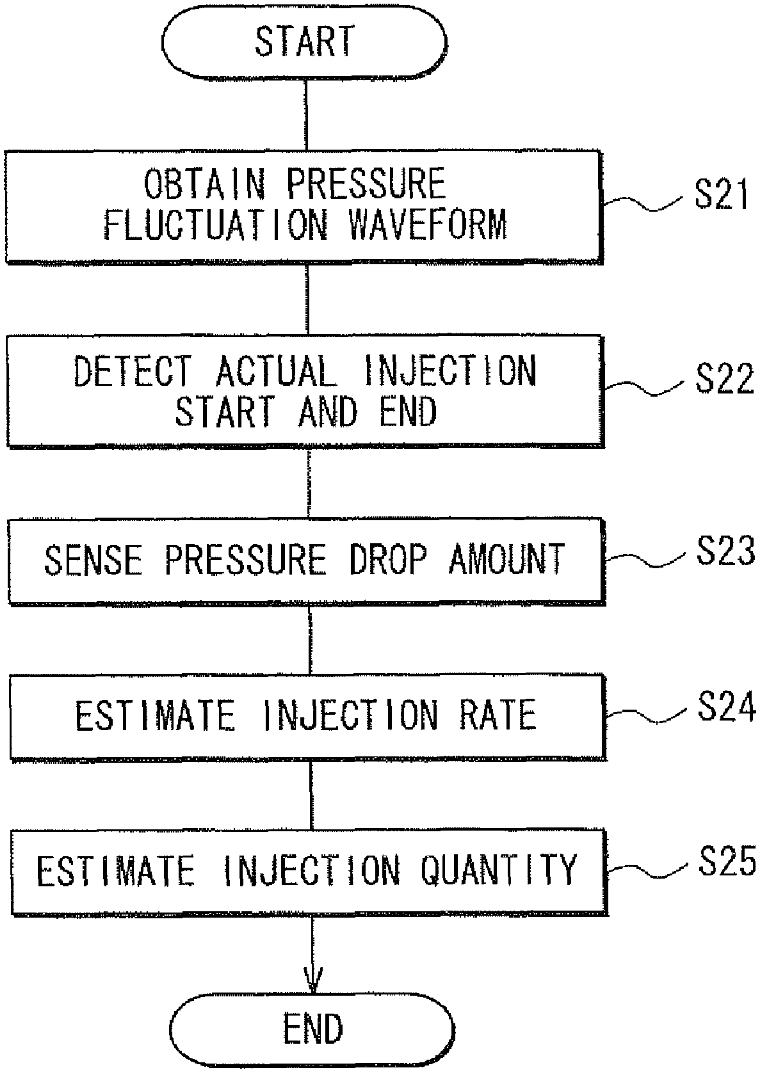
FIG. 4 is a flowchart showing a processing procedure of fuel injection quantity estimation according to the embodiment.

A series of processing shown in FIG. 4 is performed in a predetermined cycle (for example, a cycle of the computation performed by the CPU described above) or at every predetermined crank angle. First, in S21, the output value (sensed pressure P) of the fuel pressure sensor 20*a* is taken. This processing for taking in the output value is performed for each of the multiple fuel pressure sensors 20*a*. Hereafter, the output value taking processing of S21 will be explained in more detail with reference to FIG. 5.

Figure 5:
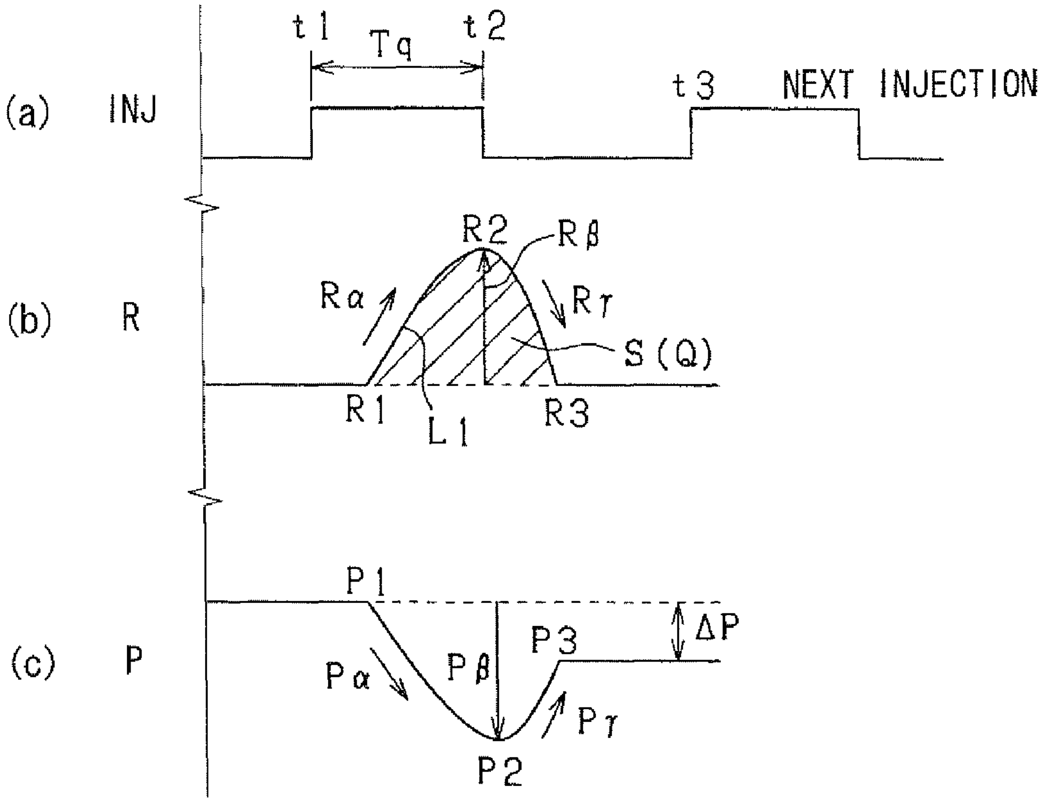
FIG. 5 is a time chart showing a relationship between a fluctuation waveform of sensed pressure and an injection rate transition waveform according to the embodiment.

Part (a) of FIG. 5 shows the injection command signal INJ outputted to the injector 20 in S13 of FIG. 3. The solenoid 20*b* is operated by switch-on of a pulse (i.e., pulse-on) of the command signal INJ, and thus the injection holes 20*f* are opened. That is, an injection start is commanded at pulse-on timing t1 of the injection command signal INJ, and an injection end is commanded at pulse-off timing t2. Therefore, the injection quantity Q is controlled by controlling a valve opening period Tq of the injection holes 20*f* by a pulse-on period (i.e., an injection command period) of the command signal INJ, Part (b) of FIG. 5 shows change (transition) of a fuel injection rate R of the fuel from the injection holes 20*f* caused in connection with the above-described injection command. Part (c) of FIG. 5 shows change (a fluctuation waveform) of the output value (the sensed pressure P) of the fuel pressure sensor 20*a* caused with change of the injection rate R.

The ECU 30 senses the output value of the fuel pressure sensor 20*a* by subroutine processing separate from the processing of FIG. 4. The ECU 30 sequentially obtains the output value of the fuel pressure sensor 20*a* by the subroutine processing at an interval short enough to plot the profile of the pressure transition waveform with the sensor output, i.e., at an interval shorter than the processing cycle of FIG. 4. An example profile is illustrated in part (c) of FIG. 5. More specifically, the sensor output is serially obtained at an interval shorter than 50 microseconds (or more preferably, 20 microseconds).

The transition waveform of the injection rate R can be estimated from the fluctuation waveform of the sensed pressure P since there is a correlation between the fluctuation of the sensed pressure P sensed with the fuel pressure sensor 20*a* and the change of the injection rate R as explained below. That is, after timing to when the injection start command is outputted as shown in part (a) of FIG. 5, the injection rate R starts increasing at timing R1 and the injection is started. As the injection rate R starts increasing at the timing R1, the sensed pressure P starts decreasing at a changing point P1. Then, as the injection rate R reaches the maximum injection rate at timing R2, the decrease of the sensed pressure P stops at a changing point P2. Then, as the injection rate R starts decreasing at the timing R2, the sensed pressure P starts increasing at the changing point P2. Then, as the injection rate R becomes zero and the actual injection ends at timing R3, the increase of the sensed pressure P stops at a changing point P3.

Thus, the increase start timing R1 (actual injection start timing) and the decrease end timing R3 (actual injection end timing) of the injection rate R can be estimated by detecting the changing points P1 and P3 in the fluctuation of the sensed pressure P sensed by the fuel pressure sensor 20*a*. Moreover, the change of the injection rate R can be estimated from the fluctuation of the sensed pressure P based on the correlation between the fluctuation of the sensed pressure P and the change of the injection rate R as explained below.

That is, there is a correlation between a pressure decrease rate Pα from the changing point P1 to the changing point P2 of the sensed pressure P and an injection rate increase rate Rα from the changing point R1 to the changing point R2 of the injection rate R. There is a correlation between a pressure increase rate Pγ from the changing point P2 to the changing point P3 and an injection rate decrease rate Rγ from the changing point R2 to the changing point R3. There is a correlation between a pressure decrease amount Pβ (the maximum drop amount) from the changing point P1 to the changing point P2 and an injection rate increase amount Rβ from the changing point R1 to the changing point R2. Accordingly, the injection rate increase rate Rα, the injection rate decrease rate Rγ, and the injection rate increase amount Rβ of the injection rate R can be estimated by sensing the pressure decrease rate Pα, the pressure increase rate Pγ, and the pressure decrease amount Pβ from the fluctuation of the sensed pressure P sensed by the fuel pressure sensor 20*a*. As described above, the various states R1, R3, Rα, Rβ, and Rγ of the injection rate R can be estimated, and eventually, the change (the transition waveform) of the fuel injection rate R shown in part (b) of FIG. 5 can be estimated.

An integration value of the injection rate R from the actual injection start to the actual injection end (i.e., a shaded area indicated by the mark S in part (b) of FIG. 5) corresponds to the injection quantity Q. An integration value of the pressure P in a portion of the fluctuation waveform of the sensed pressure P corresponding to the change of the injection rate R from the start to the end of the actual injection (i.e., a portion from the changing point P1 to the changing point P3) is correlated with the integration value S of the injection rate R. Therefore, the injection rate integration value S equivalent to the injection quantity Q can be estimated by calculating the pressure integration value from the fluctuation of the sensed pressure P sensed by the fuel pressure sensor 20*a*. Thus, it can be said that the fuel pressure sensor 20*a* functions as the injection quantity sensor that senses the pressure of the fuel supplied to the injector 20 as the physical quantity relevant to the injection quantity.

In S22 subsequent to S21 of FIG. 4 described above, appearance timings of the changing points P1, P3 are detected based on the fluctuation waveform obtained in S21. More specifically, it is preferable to calculate a first order differential value of the fluctuation waveform and to detect the appearance of the changing point P1 when the differential value exceeds a threshold value for the first time after the pulse-on timing t1 of the injection command. Moreover, in the case where a stable state occurs after the appearance of the changing point P1 it is preferable to detect the appearance of the changing point P3 when the differential value falls below the threshold value for the last time before the stable state. The stable state is a state, in which the differential value fluctuates within the range of the threshold value.

In following S23, the pressure decrease amount Pβ is sensed based on the fluctuation waveform obtained in S21. For example, the pressure decrease amount Pβ is sensed by subtracting the sensed pressure P at the changing point P1 from a peak value of the sensed pressure P between the changing point P1 and the changing point P3 of the fluctuation waveform.

In following S24, the increase start timing R1 (the actual injection start timing) and the decrease end timing R3 (the actual injection end timing) of the injection rate R are estimated based on the sensing results P1, P3 of S22. Moreover, the injection rate increase amount Rβ is estimated based on the sensing result Pβ of S23. Then, the transition waveform of the injection rate R as shown in part (b) of FIG. 5 is calculated at least based on the estimates R1, R3, Rβ. The values R2, Rα, Rγ and the like may be estimated in addition to the estimates R1, R3, Rβ and may be used to calculate the injection rate transition waveform.

In following S25, the area S is calculated by performing integration of the injection rate transition waveform calculated in S24 in an interval from R1 to R3. The area S is estimated as the injection quantity Q. Thus, a series of processing of FIG. 4 is completed. The fuel injection quantity Q estimated in S25 and the injection rate transition waveform estimated in S24 are used for updating (i.e., learning) the above-described injection control map used in S12 of FIG. 3, for example.

Next, an intake-exhaust system of the engine will be explained with reference to FIGS. 6 and 7.

Figure 6:
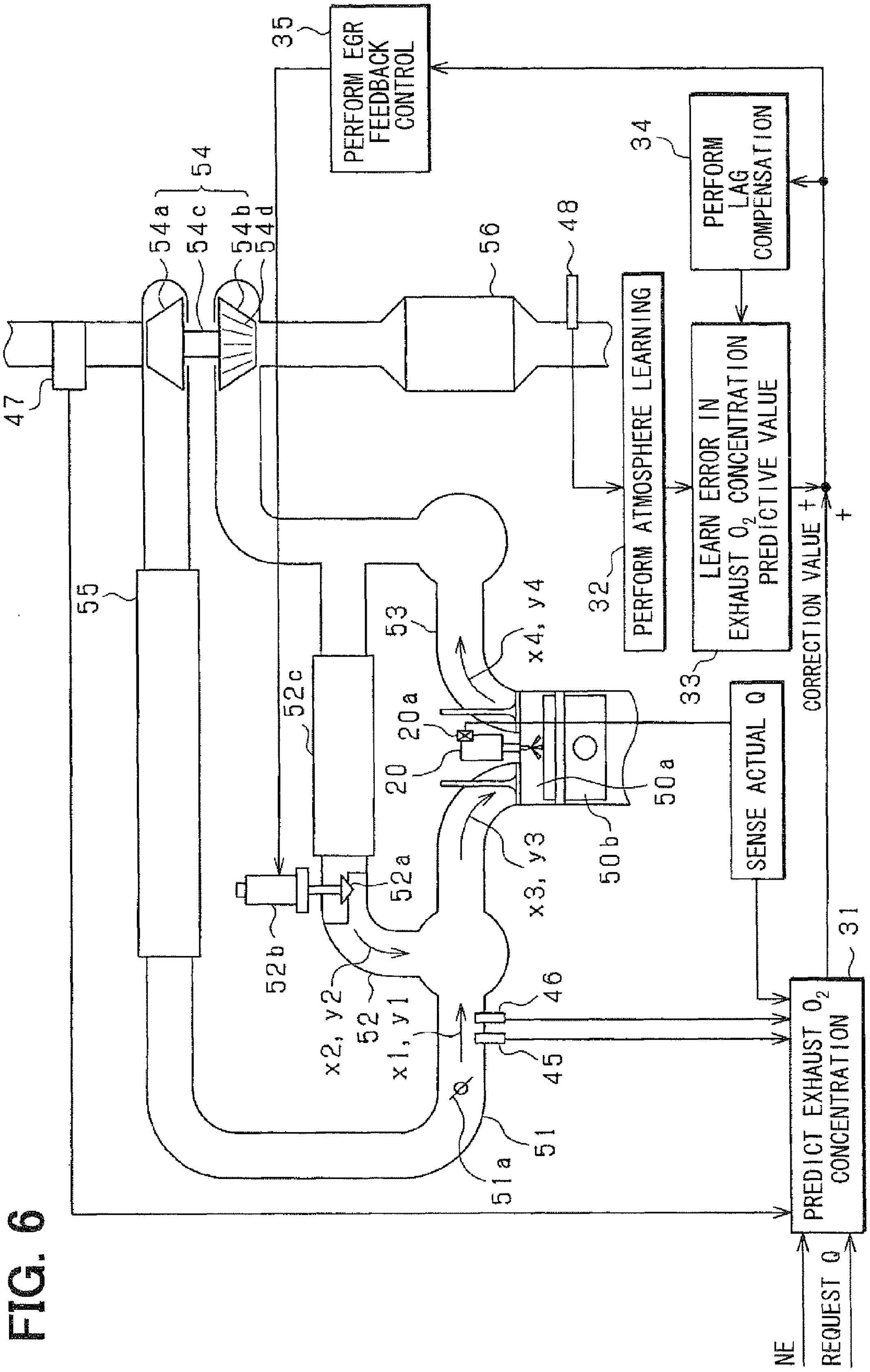
FIG. 6 is a schematic diagram showing an intake-exhaust system applied with the intake air quantity correcting device according to the embodiment.

FIG. 6 is a configuration diagram showing the intake-exhaust system of the engine shown in FIG. 1. The engine has an EGR pipe 52 for recirculating exhaust gas from an exhaust system to an intake system. The engine returns a part of the exhaust gas to an intake pipe 51, thereby lowering the combustion temperature and reducing the NOx, for example. An EGR valve 52*a* for adjusting an EGR quantity (i.e., an exhaust gas recirculation quantity) is provided in the EGR pipe 52. An electric actuator 52*b* causes the EGR valve 52*a* to perform opening-closing action. The EGR quantity is maximized at the time of fully-opening action of the EGR valve 52*a* and is brought to zero at the time of fully-closing action of the EGR valve 52*a*. An EGR cooler 52*c* is provided in the EGR pipe 52 for cooling the recirculated exhaust gas, thereby reducing the volume (i.e., increasing the density) of the recirculated exhaust gas. Thus, the EGR cooler 52*c* aims to improve a charging efficiency of the intake air flowing into a combustion chamber 50*a*.

A throttle valve 51*a* that adjusts a flow rate of a fresh air in the intake air flowing into the combustion chamber 50*a* is provided in the intake pipe 51 upstream of a point where the EGR pipe 52 is connected to the intake pipe 51. An electric actuator (not illustrated) causes the throttle valve 51*a* to perform opening-closing action. The fresh air quantity is maximized at the time of fully-opening action of the throttle valve 51*a* and is brought to zero at the time of fully-closing action of the throttle valve 51*a*. An intake pressure sensor 45 and an intake temperature sensor 46 are provided in the intake pipe 51 upstream of a point where the EGR pipe 52 is connected to the intake pipe 51. The intake pressure sensor 45 senses intake pressure (which is also supercharging pressure of a turbocharger mentioned later). The intake temperature sensor 46 senses intake air temperature. Sensing signals of the sensors 45, 46 are outputted to the ECU 30.

A turbocharger 54 (a supercharger) is provided between the intake pipe 51 and the exhaust pipe 53. The turbocharger 54 has a compressor impeller 54*a* provided in the intake pipe 51 and a turbine wheel 54*b* provided in the exhaust pipe 53. The compressor impeller 54*a* and the turbine wheel 54*b* are connected through a shaft 54*c*. In the turbocharger 54, the turbine wheel 54*b* is rotated by the exhaust gas flowing through the exhaust pipe 53, and the rotating force is transmitted to the compressor impeller 54*a* through the shaft 54*c*.

The intake air flowing through the inside of the intake pipe 51 is compressed by the compressor impeller 54*a*, and supercharge is performed.

As the turbocharger 54 according to the present embodiment, a variable capacity turbocharger capable of variably setting a rate of converting a fluid energy of the exhaust gas into the rotational driving force of the shaft 54*c* is adopted. More specifically, the turbine wheel 54*b* is provided with multiple variable vanes 54*d* for varying the flow velocity of the exhaust gas blowing against the turbine wheel 54*b*. The variable vanes 54*d* perform opening-closing action in a mutually synchronized manner. The exhaust gas flow rate is adjusted by changing a size of a gap between the adjacent variable vanes 54*d* (that is, an opening degree of the variable vanes 54*d*). Thus, the rotation speed of the turbine wheel 54*b* is adjusted. Thus, a quantity of the air compulsorily supplied to the combustion chamber 50*a*, i.e., supercharging pressure, is adjusted by adjusting the rotation speed of the turbine wheel 54*b*.

The air supercharged by the turbocharger 54 is cooled by an intercooler 55 and then fed to the downstream side of the intercooler 55. The intake air is cooled by the intercooler 55 to reduce the volume (i.e., to increase the density) of the intake air, thereby improving the charging efficiency of the intake air flowing into the combustion chamber 50*a*.

An airflow meter 47 (an intake air quantity sensor) for sensing a mass flow rate of the intake air inflowing per unit time (which is simply referred to as an intake air quantity or an intake quantity hereafter) is fixed to a portion of the intake pipe 51 upstream of the compressor impeller 54*a*. A hot wire type airflow meter that indirectly senses the intake air quantity by sensing change of a heat amount taken from a heating element in accordance with the intake flow rate is adopted as the airflow meter 47 according to the present embodiment.

A purification device 56 for purifying the exhaust gas is fixed to a portion of the exhaust pipe 53 downstream of the turbine wheel 54*b*. An example of the purification device 56 includes a DPF (diesel particulate filter) for collecting particulate matters in the exhaust gas, a NOx catalyst for purifying NOx in the exhaust gas, an oxidation catalyst for purifying HC and CO in the exhaust gas, and the like.

An A/F sensor 48 (an oxygen concentration sensor) for sensing an oxygen concentration in the exhaust gas is fixed to a portion of the exhaust pipe 53 downstream of the purification device 56. The A/F sensor 48 is an oxygen concentration sensor that outputs an oxygen concentration sensing signal corresponding to an exhaust oxygen concentration of each time. Generally, adjustment is made such that the oxygen concentration sensing signal as the sensor output of the A/F sensor 48 changes linearly in accordance with the oxygen concentration. In place of the A/F sensor 48, an O2 sensor of an electromotive force output type that outputs an electromotive force signal varying in accordance with whether the exhaust gas is rich or lean may be used.

Next, an outline of control of the intake-exhaust system performed by the ECU 30 will be explained.

The microcomputer of the ECU 30 controls the supercharging pressure by adjusting the capacity of the variable capacity turbocharger 54. That is, the microcomputer calculates a target opening degree of the variable vanes 54*d* based on a map or the like by using parameters such as the fuel injection quantity (i.e., the injection command signal) set in S12 or the injection quantity sensed (estimated) in S25 and the engine rotation speed NE. The microcomputer controls drive of an actuator (not shown) to achieve the target opening degree, thereby controlling the variable vanes 54*d* to the target opening degree. As the engine rotation speed NE increases or the fuel injection quantity increases, the target opening degree is set to be larger, thereby increasing the supercharging pressure.

The microcomputer of the ECU 30 controls the opening degree of the EGR valve 52*a*. That is, the microcomputer calculates a target value of the oxygen concentration in the exhaust gas (an exhaust oxygen concentration), i.e., a target exhaust oxygen concentration, based on a map or the like by using parameters such as the fuel injection quantity (the injection command signal) set in S12 or the injection quantity sensed (estimated) in S25 and the engine rotation speed NE. Then, the microcomputer controls the opening degree of the EGR valve 52*a* (as EGR feedback control) to approximate the exhaust oxygen concentration, which is predicted by an exhaust oxygen concentration predicting section 31 (refer to FIG. 6) mentioned later, to the target exhaust oxygen concentration. The microcomputer of the ECU 30 controls the opening degree of the throttle valve 51*a* based on the intake air quantity sensed with the airflow meter 47, the opening degree of the EGR valve 52*a* and the like.

A sufficient NOx reduction effect cannot be obtained when the EGR quantity is too small. When the EGR quantity is excessive, the oxygen in the cylinder becomes insufficient and the particulate matters (specifically, the smoke) increase. In order to avoid these situations, it is necessary to increase the EGR quantity close to the smoke generation limit, thereby reducing the NOx without generating the smoke. Therefore, the above-mentioned target exhaust oxygen concentration is set so that the exhaust oxygen concentration, which is strongly correlated with the generation amount of the particulate matters or more specifically the smoke, is brought to a predetermined value or over by the above-mentioned EGR feedback control, thereby increasing the EGR quantity close to the smoke generation limit. The target exhaust oxygen concentration is set in accordance with the condition of the purification device 56.

Next, control blocks of FIG. 6 concerning the above-described EGR feedback control will be explained. Various sections 31, 32, 33, 34, 35 of FIG. 6 constituting the control blocks are sections executed by the microcomputer of the ECU 30.

The exhaust oxygen concentration predicting section 31 performs prediction calculation of the exhaust oxygen concentration used for the above-described EGR feedback control. The predicting section 31 stores a physical model that models the intake-exhaust system. Following parameters are used as input values of the physical model. That is, the input values of the physical model include the injection quantity sensing value estimated (sensed) in S25 based on the sensed pressure P sensed with the fuel pressure sensor 20*a*, the intake air quantity sensing value sensed with the airflow meter 47, the request injection quantity Q of the fuel set in S12, the engine rotation speed NE sensed with the crank angle sensor 42, the intake pressure sensed with the intake pressure sensor 45, the intake air temperature sensed with the intake temperature sensor 46 and the like. Then, the predicting section 31 performs the calculation of the physical model based on the input values. As the result of the calculation, the exhaust oxygen concentration can be obtained as an output value of the physical model.

According to the knowledge of the inventors of the present invention, as previously explained using Expressions (1) to (8) and (7'), a sensing target of either one of the intake air quantity sensor, the injection quantity sensor and the oxygen concentration sensor can be calculated based on the sensing values of the other two sensors. Therefore, it can be said that the oxygen concentration can be calculated based on the injection quantity sensing value and the intake air quantity sensing value. It can be said that the above-described physical model calculates the oxygen concentration based on this knowledge. That is, the above-described physical model calculates the exhaust oxygen concentration based on the injection quantity sensing value sensed with the fuel pressure sensor 20*a* and the intake air quantity sensing value sensed with the airflow meter 47.

In the present embodiment, a difference between the exhaust oxygen concentration calculation value calculated in this way and the actual exhaust oxygen concentration sensing value sensed with the A/F sensor 48 is calculated, and the difference is regarded as a sensing error of the intake air quantity sensing value used in the above-described physical model. That is, the intake air quantity is calculated using the above-mentioned physical model based on the injection quantity sensing value sensed with the fuel pressure sensor 20*a* and the oxygen concentration sensing value sensed with the A/F sensor 48 and the difference between the intake air quantity calculation value and the intake air quantity sensing value sensed with the airflow meter 47 is regarded as the sensing error of the intake air quantity sensing value.

An error learning section 33 learns the value of the sensing error of the airflow meter 47 calculated in this way by storing the sensing error value in a map defining a relationship between the sensing error value and the intake air quantity. The error learning section 33 corrects the sensing value of the airflow meter 47 based on the map, thereby reflecting the learning result in the subsequent calculation processing of the exhaust oxygen concentration performed by the exhaust oxygen concentration predicting section 31.

In the calculating processing for calculating the difference between the exhaust oxygen concentration calculation value and the exhaust oxygen concentration sensing value, the exhaust oxygen concentration sensing value corrected by an atmosphere learning section 32 is used. The output value (output voltage) of the A/F sensor 48 with respect to the actual exhaust oxygen concentration contains a variation due to an individual difference. Therefore, the atmosphere learning section 32 performs the atmosphere learning for correcting the variation in the output value with an atmospheric state.

Since the A/F sensor 48 is arranged downstream of the purification device 56, exhaust passage length from the combustion chamber 50*a* to the A/F sensor 48 is long to an extent that the length as a lag module of the physical model is not negligible. That is, there occurs a lag until the exhaust oxygen concentration calculation value calculated by the physical model is reflected in the actual sensing value of the A/F sensor 48. Therefore, when the sensing error of the airflow meter 47 is calculated with the error learning section 33, the lag module is compensated by a lag compensating section 34. The section 35 performs the EGR feedback control based on the exhaust oxygen concentration.

Next, processing procedures for calculating the predictive value of the exhaust oxygen concentration used for the above-described EGR feedback control and learning processing procedures for calculating and learning the sensing error of the airflow meter 47 will be explained with reference to FIG. 7.

Figure 7:
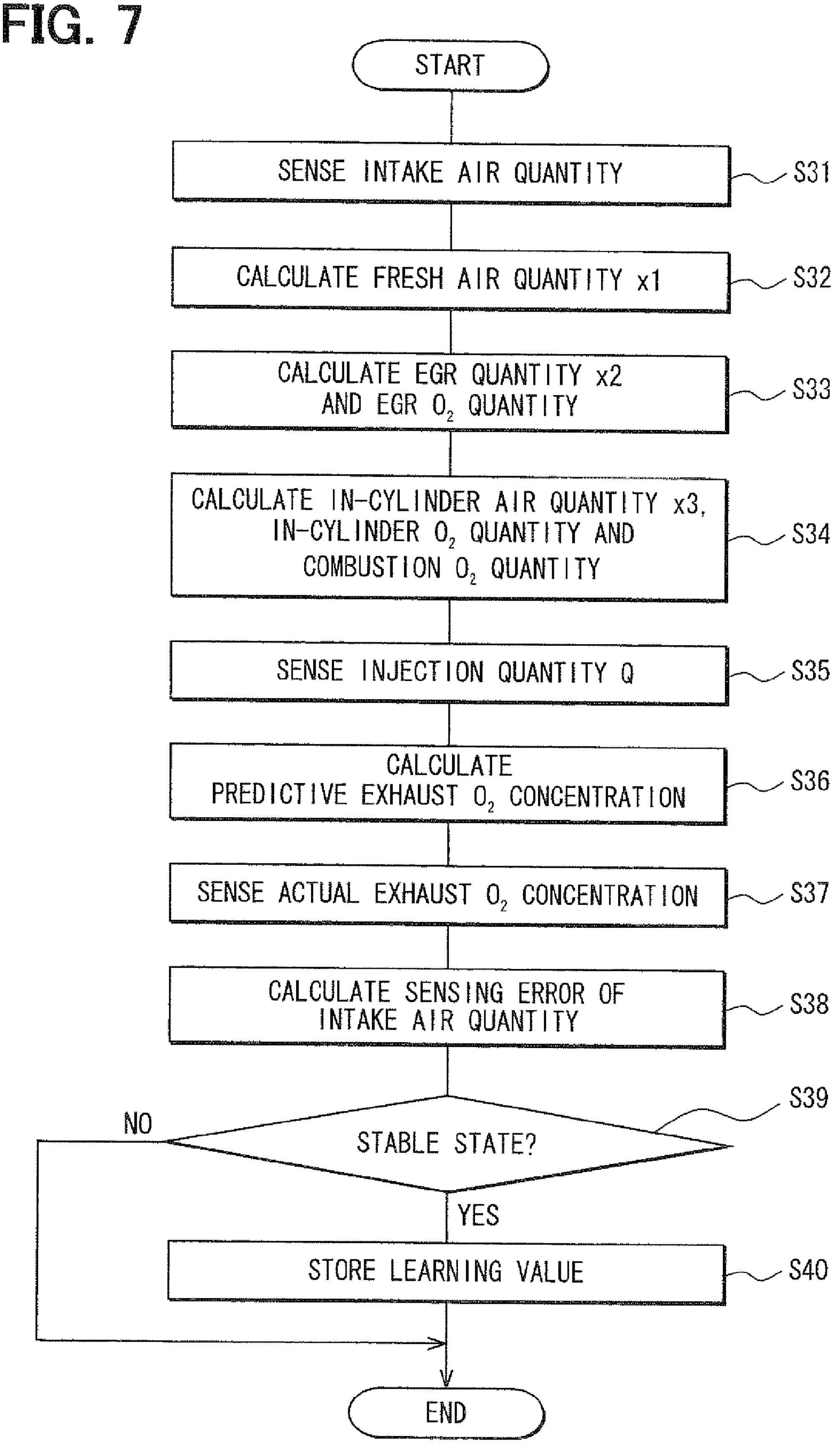
FIG. 7 is a flowchart showing a predictive value calculation processing procedure of an exhaust oxygen concentration and a learning processing procedure of a sensing error of an airflow meter according to the embodiment.

The microcomputer of the ECU 30 performs a series of processing shown in FIG. 7 in a predetermined cycle (for example, a cycle of the computation performed by the CPU described above) or at an interval of a predetermined crank angle. First in S31, the intake air quantity is sensed with the airflow meter 47. Then, in following S32, the intake air quantity is calculated based on the sensing value outpuffed from the airflow meter 47. The intake air quantity is equivalent to the fresh air quantity x1 of Expression (1) mentioned above. Therefore, in the calculation using Expression (1) in subsequent steps, the fresh air quantity x1 calculated in S32 based on the intake air quantity sensing value sensed with the airflow meter 47 can be used.

In following S33, the EGR quantity and the oxygen quantity in the recirculated exhaust gas are calculated. The EGR quantity is equivalent to the variable x2 of Expression (2) mentioned above and is calculated based on Expressions (1) to (3). The oxygen quantity in the recirculated exhaust gas is calculated by multiplying a recirculated exhaust oxygen concentration equivalent to the value y2 of Expression (2) by the EGR quantity x2. That is, the oxygen quantity y2·x2 in the recirculated exhaust gas is calculated based on Expressions (1) to (8).

In following S34, an in-cylinder air quantity, an in-cylinder oxygen quantity suctioned into the cylinder, and a combustion oxygen quantity used for the combustion are calculated. The in-cylinder air quantity is equivalent to the variable x3 of Expression (3) and is theoretically calculated based on the volume of the combustion chamber 50*a*, a suction efficiency at the time when the piston 50*b* descends and the like. The in-cylinder oxygen quantity is calculated by multiplying an oxygen concentration of an intake air in a state where the recirculated exhaust gas is mixed with the fresh air (equivalent to the variable y3 of Expression (7)) by the in-cylinder air quantity x3. That is, the in-cylinder oxygen quantity y3·x3 is calculated based on Expressions (1) to (8). The combustion oxygen quantity is theoretically calculated based on the fuel injection quantity, which is estimated (sensed) based on the sensed pressure of the injection quantity sensor 20*a*, the in-cylinder oxygen quantity y3·x3 and the like.

In following S35, the fuel injection quantity Q sensed (estimated) in S25 is obtained. Therefore, in the calculation using Expression (8), the injection quantity sensing value Q obtained in S35 can be used. In following S36, the exhaust oxygen concentration as a predictive value is calculated by the exhaust oxygen concentration predicting section 31 mentioned above. More specifically, the exhaust oxygen concentration is calculated by following Expression (9).

exhaust oxygen concentration=(in-cylinder oxygen quantity−combustion oxygen quantity)/(in-cylinder air quantity+injection quantity)    Expression (9)

Among the parameters on the right-hand side of Expression (9), the values calculated in S34 are assigned to the in-cylinder oxygen quantity, the combustion oxygen quantity and the in-cylinder air quantity, and the injection quantity Q obtained in S35 is assigned to the injection quantity. Thus, the exhaust oxygen concentration as the left-hand side of Expression (9) is calculated.

In following S37, the actual exhaust oxygen concentration sensing value sensed with the AF sensor 48 is obtained. In following S38, a difference between the exhaust oxygen concentration calculation value calculated in S36 and the exhaust oxygen concentration sensing value obtained in S37 is calculated and is regarded as the sensing error of the intake air quantity sensed with the airflow meter 47 in S31.

In following S39, it is determined whether the sensing with the airflow meter 47 in S31 and the sensing with the fuel pressure sensor 20*a* in S35 are performed when the engine operation state is stable. Whether the engine operation state is stable is determined based on whether following conditions (1) to (7) are satisfied.

(1) The EGR valve 52*a* is continuously fixed in a fully closed state.

(2) The throttle valve 51*a* is continuously fixed in a fully opened state.

(3) The capacity of the turbocharger 54 (i.e., the opening degree of the variable vanes 54*d*) is continuously set within a predetermined range.

(4) The supercharging pressure by the turbocharger 54 remains stable for a specified time or over.

(5) The engine rotation speed NE remains stable for a specified time or over.

(6) The intake air quantity sensing value sensed with the airflow meter 47 remains stable for a specified time or over.

(7) The injection quantity estimated based on the sensed pressure sensed with the fuel pressure sensor 20*a* remains stable for a specified time or oven.

The process proceeds to S40 when it is determined that all of or at least one of the stability conditions (1) to (7) is satisfied in S39. In S40, the error learning section 33 learns the value of the intake air quantity sensing error of the airflow meter 47 calculated in S38 into the map defining the relationship between the sensing error value and the intake air quantity.

In the processing shown in FIG. 7, the processing of S31 to S38 is performed irrespective of the result of the stability condition determination in S39. Alternatively, the stability condition determination may be performed before the processing of S31. Then, the processing of S31 to S38 may be performed when it is determined that the engine operation state is stable and the processing of S31 to S38 may not be performed when it is determined that the engine operation state is not stable. Thus, a processing load of the microcomputer may be reduced.

The present embodiment described above exerts following effects.

The exhaust oxygen concentration is calculated by the physical model based on the injection quantity sensing value sensed with the fuel pressure sensor 20*a* and the intake air quantity sensing value sensed with the airflow meter 47. The difference between the exhaust oxygen concentration calculation value calculated in this way and the actual exhaust oxygen concentration sensing value sensed with the A/F sensor 48 is calculated, and the difference is regarded as the sensing error of the intake air quantity sensing value used in the above-described physical model. The sensing value of the airflow meter 47 is corrected based on the value of the sensing error of the airflow meter 47 obtained in this way. That is, the sensing value of the airflow meter 47 can be corrected based on the sensing values of the other sensors 20*a*, 48 (i.e., the injection quantity sensing value and the oxygen concentration sensing value).

Sensing accuracy of the sensing values of the fuel pressure sensor 20*a* and the A/F sensor 48 is higher than that of the sensing value of the airflow sensor 47. Accordingly, the sensing value of the airflow meter 47 can be corrected. Therefore, the accuracy of the prediction calculation performed by the exhaust oxygen concentration predicting section 31 using the sensing value of the airflow meter 47 can be improved. Other control using the sensing value of the airflow meter 47 (for example, control of the throttle valve 51*a* or the like) can be performed with high accuracy.

The value of the sensing error of the airflow meter 47 is stored in the map defining the relationship between the sensing error value and the intake air quantity and is learned. Accordingly, the values of the error in the entire sensing range of the airflow meter 47 can be stored in the map. Therefore, the intake air quantity sensing value can be corrected in the entire sensing range of the airflow meter 47.

Among the sensing errors of the airflow meter 47, only the errors calculated based on the injection quantity sensing value, the oxygen concentration sensing value and the intake air quantity sensing value sensed when the operation state of the internal combustion engine is stable (i.e., when all of or at least one of the above-mentioned conditions (1) to (7) is satisfied) are stored and learned in the map. Accordingly, only the sensing errors obtained with high accuracy are stored and learned, so the correction accuracy of the sensing value of the airflow meter 47 can be improved.

The response delay arises in the sensing value of the A/F sensor 48 in accordance with a circulation time necessary for the exhaust gas discharged from the combustion chamber 50*a* to reach the A/F sensor 48. In this regard, in the present embodiment, the feedback control of the opening degree of the EGR valve 52*a* is performed using the oxygen concentration calculation value calculated based on the injection quantity sensing value and the intake air quantity sensing value. Therefore, the EGR valve 52*a* can be controlled with high response as compared with the case where the feedback control is performed using the exhaust oxygen concentration sensing value sensed with the A/F sensor 48.

The above-described embodiment may be modified and implemented as follows, for example. Moreover, the present invention is not limited to the above-described embodiment. Characteristic structures of the embodiment may be combined arbitrarily.

In the calculation of the sensing error of the airflow meter 47 in the above-described embodiment the exhaust oxygen concentration is calculated using the physical model based on the injection quantity sensing value and the intake air quantity sensing value, and the difference between the exhaust oxygen concentration calculation value obtained through the calculation and the actual exhaust oxygen concentration sensing value is regarded as the sensing error of the intake air quantity sensing value used in the above-described physical model. In this case, the section performing the calculation of the exhaust oxygen concentration using the physical model corresponds to a calculating means according to the present invention.

Alternatively, the injection quantity may be calculated using the physical model based on the exhaust oxygen concentration sensing value and the intake air quantity sensing value, and the sensing error of the airflow meter 47 may be calculated by regarding a difference between the injection quantity calculation value obtained by the calculation and the actual injection quantity sensing value as the sensing error of the intake air quantity sensing value used in the above-described physical model. In this case, a section performing the calculation of the injection quantity using the physical model corresponds to the calculating means.

Alternatively the intake air quantity may be directly calculated using a physical model or the like based on the injection quantity sensing value and the exhaust oxygen concentration sensing value, and a difference between the intake air quantity calculation value obtained by the calculation and the actual intake air quantity sensing value may be calculated as the sensing error of the airflow meter 47. In this case, a section performing the calculation of the intake air quantity using the physical model or the like corresponds to the calculating means.

In the above-described embodiment, the value of the intake air quantity sensing error of the airflow meter 47 is stored in the map while correlating the error value with the intake air quantity Alternatively, in place of the correlation with the intake air quantity, the intake air quantity sensing error may be stored in the map while correlating the error value with other parameters such as the intake pressure sensed with the intake pressure sensor 45 or the intake air temperature sensed with the intake temperature sensor 46.

In order to fix the fuel pressure sensor 20*a* to the injector 20, in the above-described embodiment, the fuel pressure sensor 20*a* is fixed to the fuel inlet 22 of the injector 20. Alternatively, as shown by a chained line 200*a* in FIG. 2, a fuel pressure sensor 200*a* may be mounted inside the housing 20*e* to sense fuel pressure in the internal fuel passage 25 extending from the fuel inlet 22 to the injection holes 20*f*.

The fixing structure of the fuel pressure sensor 20*a* can be simplified in the case where the fuel pressure sensor 20*a* is fixed to the fuel inlet 22 as described above as compared with the case where the fuel pressure sensor 200*a* is mounted inside the housing 20*e*. When the fuel pressure sensor 200*a* is mounted inside the housing 20*e*, the fixing position of the fuel pressure sensor 200*a* is closer to the injection holes 20*f* than in the case where the fuel pressure sensor 20*a* is fixed to the fuel inlet 22. Therefore, the pressure fluctuation in the injection holes 20*f* can be sensed more appropriately.

The fuel pressure sensor 20*a* may be fixed to the high-pressure pipe 14. In this case, it is preferable to fix the fuel pressure sensor 20*a* to a position distanced from the common rail 12 by a predetermined distance.

A flow rate restricting section may be provided between the common rail 12 and the high-pressure pipe 14 for restricting a flow rate of the fuel flowing from the common rail 12 to the high-pressure pipe 14. The flow rate restricting section functions to block the flow passage when an excessive fuel outflow is generated by fuel leakage due to a damage to the high-pressure pipe 14, the injector 20 or the like. For example, the flow rate restricting section may be constituted of a valve member such as a ball that blocks the flow passage when the excessive flow rate occurs. Alternatively, a flow damper constituted by integrally combining the orifice 12*a* (the fuel pulsation reducing section) and the flow rate restricting section may be adopted.

In addition to the construction of arranging the fuel pressure sensor 20*a* downstream of the orifice and the flow rate restricting section with respect to the fuel flow direction, the fuel pressure sensor 20*a* may be arranged downstream of at least one of the orifice and the flow rate restricting section.

An arbitrary number of the fuel pressure sensor(s) 20*a* may be used. For example, two or more sensors 20*a* may be provided to the fuel flow passage of one cylinder. A rail pressure sensor for sensing the pressure in the common rail 12 may be provided in addition to the above-described fuel pressure sensor 20*a*.

In place of the electromagnetic drive injector 20 shown in FIG. 2, a piezo drive injector may be used. Alternatively, an injector that does not cause pressure leak from the leak hole 24 and the like such as a direct acting injector that transmits the drive power not through the oil pressure chamber Cd (for example, a direct acting piezo injector having been developed in recent years) can be also used. In the case where the direct acting injector is used, control of the injection rate is facilitated.

The kind and the system configuration of the engine as the control target can also be arbitrarily modified in accordance with the use and the like. Although the present invention is applied to the diesel engine as an example in the above embodiment, the present invention can be also applied to a spark ignition gasoline engine (specifically, a direct-injection engine) or the like basically in the similar way. For example, a fuel injection system of a direct injection gasoline engine generally has a delivery pipe that stores fuel (gasoline) in a high-pressure state. In the system, the fuel is pumped from a fuel pump to the delivery pipe, and the high-pressure fuel in the delivery pipe is distributed to multiple injectors 20 and injected and supplied into engine combustion chambers. In this system, the delivery pipe corresponds to the pressure accumulator. The device and the system according to the present invention can be applied not only to the injector that injects the fuel directly into the cylinder but also to an injector that injects the fuel to an intake passage or an exhaust passage of the engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An intake air quantity correcting device comprising:

an intake air quantity obtaining means for obtaining an intake air quantity sensing value from an intake air quantity sensor that senses an intake air quantity flowing from an intake system into a combustion chamber of an internal combustion engine;

an injection quantity obtaining means for obtaining an injection quantity sensing value from an injection quantity sensor that senses an injection quantity of fuel injected from an injector or a physical quantity relevant to the injection quantity;

an oxygen concentration obtaining means for obtaining an oxygen concentration sensing value from an oxygen concentration sensor that senses an oxygen concentration in exhaust gas discharged from the internal combustion engine;

a calculating means for calculating a sensing target of a certain one of the intake air quantity sensor, the injection quantity sensor and the oxygen concentration sensor based on sensing values of the other two sensors; and an intake air quantity correcting means for correcting the intake air quantity sensing value based on a difference between the calculation value calculated by the calculating means and the sensing value of the certain one of the sensors.

2. The intake air quantity correcting device as in claim 1, wherein the calculating means calculates the intake air quantity based on the injection quantity sensing value and the oxygen concentration sensing value, and the intake air quantity correcting means corrects the intake air quantity sensing value based on a difference between the intake air quantity calculation value calculated by the calculating means and the intake air quantity sensing value.

3. The intake air quantity correcting device as in claim 1, wherein the calculating means calculates the oxygen concentration based on the intake air quantity sensing value and the injection quantity sensing value, and the intake air quantity correcting means corrects the intake air quantity sensing value based on a difference between the oxygen concentration calculation value calculated by the calculating means and the oxygen concentration sensing value.

4. The intake air quantity correcting device as in claim 1, further comprising:

a learning means for regarding a difference between the calculation value calculated by the calculating means and the sensing value of the certain one of the sensors as an error of the intake air quantity sensing value and for storing a value of the error in a map defining a relationship between the error and the intake air quantity.

5. The intake air quantity correcting device as in claim 1, wherein the internal combustion engine has an exhaust gas recirculation valve for regulating an exhaust gas recirculation quantity recirculated from an exhaust system to an intake system, and the calculating means performs the calculation and the intake air quantity correcting means performs the correction based on the injection quantity sensing value, the oxygen concentration sensing value and the intake air quantity sensing value sensed when the exhaust gas recirculation valve is fixed to a fully closed state continuously.

6. The intake air quantity correcting device as in claim 1, wherein the internal combustion engine has a throttle valve that adjusts the intake air quantity flowing into the combustion chamber, and the calculating means performs the calculation and the intake air quantity correcting means performs the correction based on the injection quantity sensing value, the oxygen concentration sensing value and the intake air quantity sensing value sensed when the throttle valve is fixed to a fully opened state continuously.

7. The intake air quantity correcting device as in claim 1, wherein the internal combustion engine has a supercharger that supercharges the intake air by using the exhaust gas as a source of a driving force, the supercharger is structured to be able to variably set a conversion rate for converting a fluid energy of the exhaust gas into the driving force, and the calculating means performs the calculation and the intake air quantity correcting means performs the correction based on the injection quantity sensing value, the oxygen concentration sensing value and the intake air quantity sensing value sensed when the conversion rate of the supercharger is set within a predetermined range continuously.

8. The intake air quantity correcting device as in claim 1, wherein the internal combustion engine has a supercharger that supercharges the intake air by using the exhaust gas as a source of a driving force, and the calculating means performs the calculation and the intake air quantity correcting means performs the correction based on the injection quantity sensing value, the oxygen concentration sensing value and the intake air quantity sensing value sensed when supercharging pressure provided by the supercharger remains stable for a specified time or over.

9. The intake air quantity correcting device as in claim 1, wherein the calculating means performs the calculation and the intake air quantity correcting means performs the correction based on the injection quantity sensing value, the oxygen concentration sensing value and the intake air quantity sensing value sensed when rotation speed of an output shaft of the internal combustion engine remains stable for a specified time or over.

10. The intake air quantity correcting device as in claim 1, wherein the calculating means performs the calculation and the intake air quantity correcting means performs the correction based on the injection quantity sensing value, the oxygen concentration sensing value and the intake air quantity sensing value sensed when the intake air quantity sensed with the intake air quantity obtaining means remains stable for a specified time or over.

11. The intake air quantity correcting device as in claim 1, wherein the calculating means performs the calculation and the intake air quantity correcting means performs the correction based on the injection quantity sensing value the oxygen concentration sensing value and the intake air quantity sensing value sensed when the injection quantity or the physical quantity relevant to the injection quantity sensed with the injection quantity obtaining means remains stable for a specified time or over.

12. The intake air quantity correcting device as in claim 1, wherein the intake air quantity correcting device is applied to an internal combustion engine control device including:

an oxygen concentration calculating means for calculating an oxygen concentration in the exhaust gas based on the intake air quantity sensing value corrected by the intake air quantity correcting means and the injection quantity sensing value; and an exhaust gas recirculation controlling means for performing feedback control of an opening degree of an exhaust gas recirculation valve to approximate the oxygen concentration calculation value calculated by the oxygen concentration calculating means to a target value.

13. The intake air quantity correcting device as in claim 1, wherein the internal combustion engine is structured to distribute and supply the fuel from a pressure accumulator, which accumulates the fuel, to the injector and the injection quantity sensor is a fuel pressure sensor that senses pressure of the fuel supplied to the injector as the physical quantity and is arranged in a fuel passage, which extends from the pressure accumulator to an injection hole of the injector, at a position closer to the injection hole than the pressure accumulator.

14. The intake air quantity correcting device as in claim 13, wherein the fuel pressure sensor is fixed to the injector.

15. The intake air quantity correcting device as in claim 14, wherein the fuel pressure sensor is fixed to a fuel inlet of the injector.

16. The intake air quantity correcting device as in claim 14, wherein the fuel pressure sensor is mounted inside the injector to sense fuel pressure in an internal fuel passage extending from the fuel inlet of the injector to the injection hole of the injector.

17. The intake air quantity correcting device as in claim 13, wherein an orifice is provided in a fuel passage, which extends from the pressure accumulator to a fuel inlet of the injector, for attenuating a pressure pulsation of the fuel in the pressure accumulator, and the fuel pressure sensor is arranged downstream of the orifice with respect to a fuel flow direction.

18. An intake air quantity correcting system comprising:

at least one of an intake air quantity sensor that senses an intake air quantity, an injection quantity sensor that senses an injection quantity or a physical quantity relevant to the injection quantity, and an oxygen concentration sensor that senses an oxygen concentration in the exhaust gas; and the intake air quantity correcting device as in claim 1.

* * * * *